US010044439B2

(12) United States Patent
Kurisu et al.

(10) Patent No.: US 10,044,439 B2
(45) Date of Patent: Aug. 7, 2018

(54) OPTICAL RECEIVER THAT RECEIVES POLARIZATION MULTIPLEXED OPTICAL SIGNAL

(71) Applicant: Fujitsu Optical Components Limited, Kawasaki-shi, Kanagawa (JP)

(72) Inventors: Masayuki Kurisu, Sapporo (JP); Shuichi Yasuda, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/723,462

(22) Filed: Oct. 3, 2017

(65) Prior Publication Data

US 2018/0152242 A1 May 31, 2018

(30) Foreign Application Priority Data

Nov. 28, 2016 (JP) ................. 2016-230625

(51) Int. Cl.
*H04B 10/08* (2006.01)
*H04B 10/06* (2006.01)
*H04B 10/00* (2013.01)
*H04B 10/079* (2013.01)
*H04J 14/06* (2006.01)
*H04B 10/61* (2013.01)
*H04B 10/60* (2013.01)
*H04J 14/02* (2006.01)

(52) U.S. Cl.
CPC ......... *H04B 10/0795* (2013.01); *H04B 10/60* (2013.01); *H04B 10/613* (2013.01); *H04B 10/616* (2013.01); *H04J 14/02* (2013.01); *H04J 14/06* (2013.01)

(58) Field of Classification Search
CPC .......... H04J 14/02; H04J 14/06; H04B 7/185; H04B 10/61; H04B 10/60; H04B 10/079; H04B 10/0795; H04B 10/613; H04B 10/00; H04B 10/616; G01J 1/04
USPC .......................... 398/25, 202, 208, 204, 136
See application file for complete search history.

(56) References Cited

U.S. PATENT DOCUMENTS

| 5,138,476 A | * | 8/1992 | Shibutani | ............... | H04B 10/61 398/152 |
| 8,249,464 B2 | * | 8/2012 | Oda | ....................... | H04B 10/60 398/162 |
| 8,625,997 B2 | * | 1/2014 | Evans | ................. | H04J 14/0227 398/140 |

(Continued)

*Primary Examiner* — Ken N Vanderpuye
*Assistant Examiner* — Abbas H Alagheband
(74) *Attorney, Agent, or Firm* — Staas & Halsey LLP

(57) ABSTRACT

An optical receiver includes a processor. The processor calculates first through fourth optical intensities that respectively indicate input optical intensities of in-phase component in the first polarization, quadrature component in the first polarization, in-phase component in the second polarization and quadrature component in the second polarization. The processor calculates polarization dependent intensity ratio and phase dependent intensity ratio based on the first through fourth optical intensities. The processor calculates an input optical intensity of a polarization multiplexed optical signal based on an optical intensity of one of the first through fourth amplifiers, the polarization dependent intensity ratio, and the phase dependent intensity ratio.

9 Claims, 12 Drawing Sheets

(56) References Cited

U.S. PATENT DOCUMENTS

| | | | |
|---|---|---|---|
| 8,649,690 B2* | 2/2014 | Gehrke | H04B 10/07955 398/136 |
| 8,768,178 B2* | 7/2014 | Khatana | H04B 10/6164 398/202 |
| 8,831,436 B2* | 9/2014 | Evans | H04B 10/073 398/162 |
| 9,042,730 B2* | 5/2015 | Vassilieva | H04B 10/6163 398/81 |
| 9,252,888 B2* | 2/2016 | Morie | H04B 10/611 |
| 9,285,267 B2* | 3/2016 | Gehrke | H04B 10/07955 |
| 9,544,087 B2* | 1/2017 | Kondo | H04J 14/0221 |
| 9,608,734 B2* | 3/2017 | Murakami | H04B 10/616 |
| 9,647,753 B1* | 5/2017 | Kurisu | H04B 10/07957 |
| 9,722,704 B2* | 8/2017 | Saito | H04B 10/40 |
| 9,722,768 B2* | 8/2017 | Inoue | H04L 7/0016 |
| 2014/0348515 A1* | 11/2014 | Tsubouchi | H04B 10/613 398/202 |
| 2016/0164624 A1* | 6/2016 | Yamauchi | H04B 10/0799 398/34 |
| 2018/0019800 A1* | 1/2018 | Buer | H04B 7/1858 |

* cited by examiner

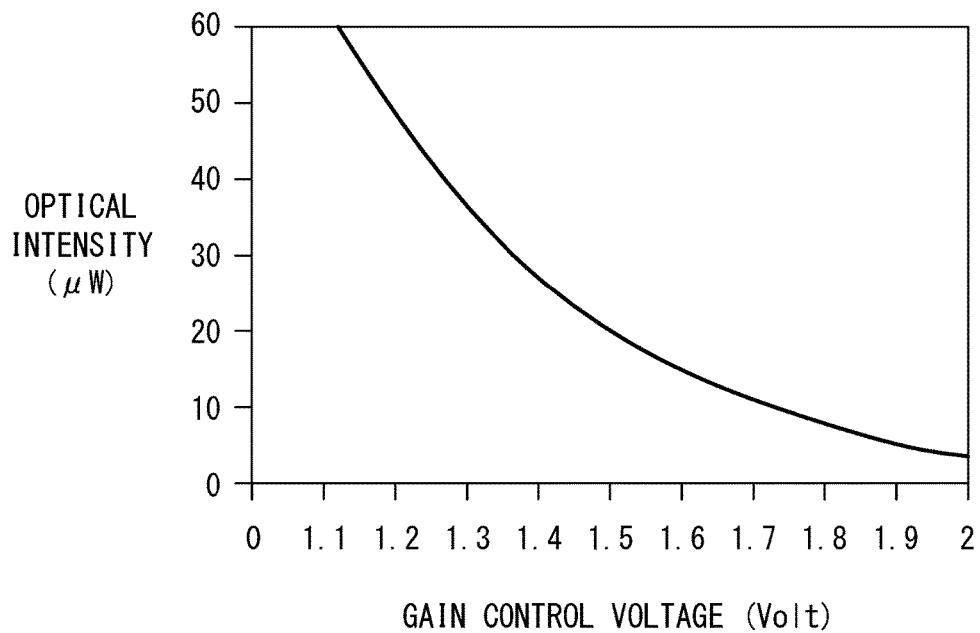
F I G. 3

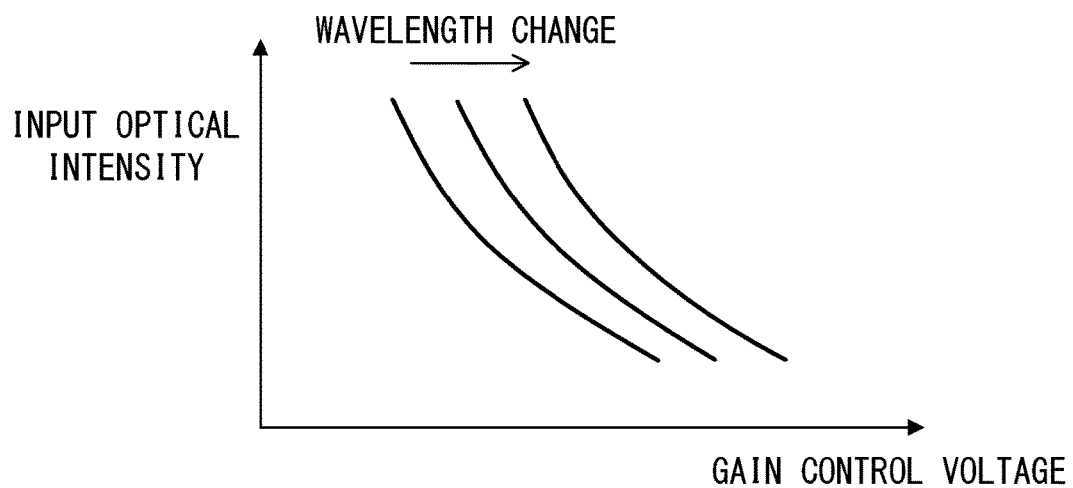
F I G. 4 A
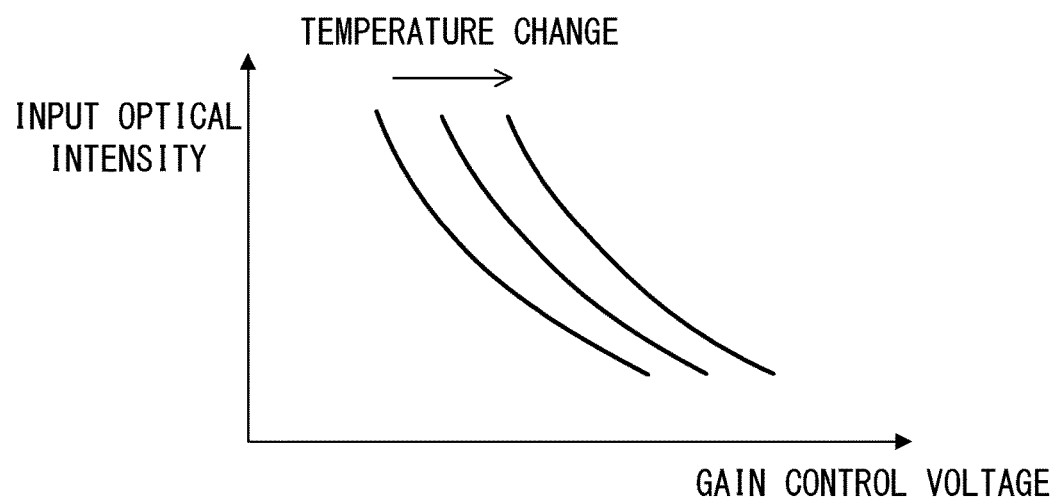
F I G. 4 B

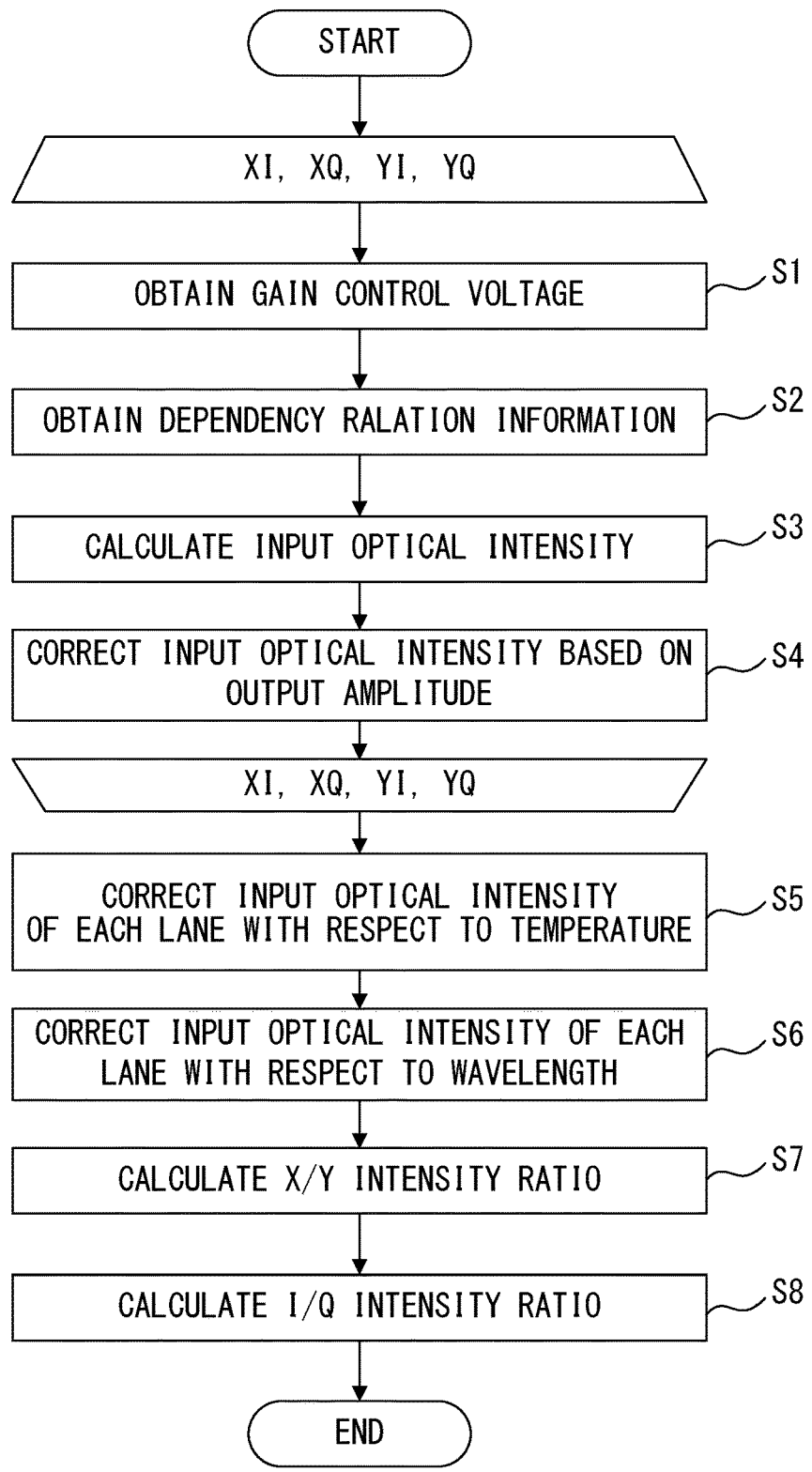
F I G. 5

OPTICAL RECEIVER THAT RECEIVES POLARIZATION MULTIPLEXED OPTICAL SIGNAL

CROSS-REFERENCE TO RELATED APPLICATION

This application is based upon and claims the benefit of priority of the prior Japanese Patent Application No. 2016-230625, filed on Nov. 28, 2016, the entire contents of which are incorporated herein by reference.

FIELD

The embodiments discussed herein are related to an optical receiver that receives a polarization multiplexed optical signal.

BACKGROUND

Coherent detection has been put into practice as a technique for realizing optical communications of a large capacity. A coherent optical receiver includes a local light source, and mixes a received optical signal and local oscillation light. The carrier wavelength of the received optical signal and the wavelength of the local oscillation light are roughly equal. The mixed light is converted into an electric signal by a photo detector. This electric signal is amplified by an amplifier (such as a transimpedance amplifier (TIA)), and is guided to a signal processing circuit. The signal processing circuit includes a demodulation circuit etc., and recovers a transmitted signal.

In the above coherent optical receiver, in order to increase the sensitivity of the photo detector, an input optical intensity (or an input optical power) for the photo detector needs be an appropriately controlled. Accordingly, a coherent optical receiver in many cases includes a variable optical attenuator (VOA) for adjusting the intensity of a received optical signal. In such a case, the coherent optical receiver has a function of detecting the intensity of the received optical signal. The variable optical attenuator is controlled based on detection results of this function such that the optical signal of preferable intensity is guided to the photo detector.

As described above, a coherent optical receiver has a function of detecting the intensity of a received optical signal. The intensity of a received optical signal is detected based on a gain of an amplifier that amplifies the optical signal (U.S. Patent Publication No. 2016/0164624 for example).

As another technique for realizing optical communications of a large capacity, polarization multiplexing has been put into practice. In polarization multiplexed communications, a pair of polarizations (X polarization and Y polarization) that are orthogonal to each other is used for transmitting data. Therefore, the transmission capacity per wavelength in polarization multiplexed communications is twice that of a communication that does not adopt polarization multiplexing.

When a coherent optical receiver receives a polarization multiplexed optical signal, an I-component and a Q-component are detected for each polarization. Accordingly, electric signals respectively corresponding to four lanes (XI, XQ, YI and YQ) are generated from a polarization multiplexed optical signal, and each electric signal is amplified by an amplifier. Then, a processor included in the coherent optical receiver obtains an input optical intensity of each lane based on a gain of each amplifier so as to calculate the sum of the intensities, and thereby detects the input optical intensity of the polarization multiplexed optical signal. This increases loads on the processor for calculating an input optical intensity when a coherent optical receiver receives a polarization multiplexed optical signal.

Note that, in order to downsize a coherent optical receiver, it is desirable that the processor execute a plurality of tasks. This leads to a risk that when heavy loads for calculating an input optical intensity are imposed on a processor, other tasks may be delayed.

SUMMARY

According to an aspect of the present invention, an optical receiver includes: a coherent detection circuit configured to mix a polarization multiplexed optical signal and local oscillation light so as to generate a first electric signal that indicates an in-phase component in a first polarization, a second electric signal that indicates a quadrature component in the first polarization, a third electric signal that indicates an in-phase component in a second polarization, and a fourth electric signal that indicates a quadrature component in the second polarization; first through fourth amplifiers respectively configured to amplify the first through fourth electric signals; a gain controller configured to control gains of the first through fourth amplifiers such that amplitudes of output signals of the first through fourth amplifiers respectively approach corresponding target amplitudes; and a processor. The processor calculates a first optical intensity that indicates an input optical intensity of an in-phase component in the first polarization based on a gain of the first amplifier, a second optical intensity that indicates an input optical intensity of a quadrature component in the first polarization based on a gain of the second amplifier, a third optical intensity that indicates an input optical intensity of an in-phase component in the second polarization based on a gain of the third amplifier, and a fourth optical intensity that indicates an input optical intensity of a quadrature component in the second polarization based on a gain of the fourth amplifier. The processor calculates a polarization dependent intensity ratio that indicates a ratio of an input optical intensity in the first polarization to an input optical intensity in the second polarization and a phase dependent intensity ratio that indicates a ratio of an input optical intensity of the in-phase component to an input optical intensity of the quadrature component based on the first through fourth optical intensities. The processor calculates an input optical intensity of the polarization multiplexed optical signal based on an optical intensity calculated according to a gain of an amplifier that is selected from among the first through fourth amplifiers, the polarization dependent intensity ratio, and the phase dependent intensity ratio.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a dependency relation between the gain of an amplifier and an input optical intensity;

FIG. 4A and FIG. 4B explain wavelength dependency and temperature dependency of dependency relation information;

FIG. 5 is a flowchart illustrating an example of a method of calculating an X/Y intensity ratio and an I/Q intensity ratio;

DESCRIPTION OF EMBODIMENTS

First Embodiment

Figure 1:
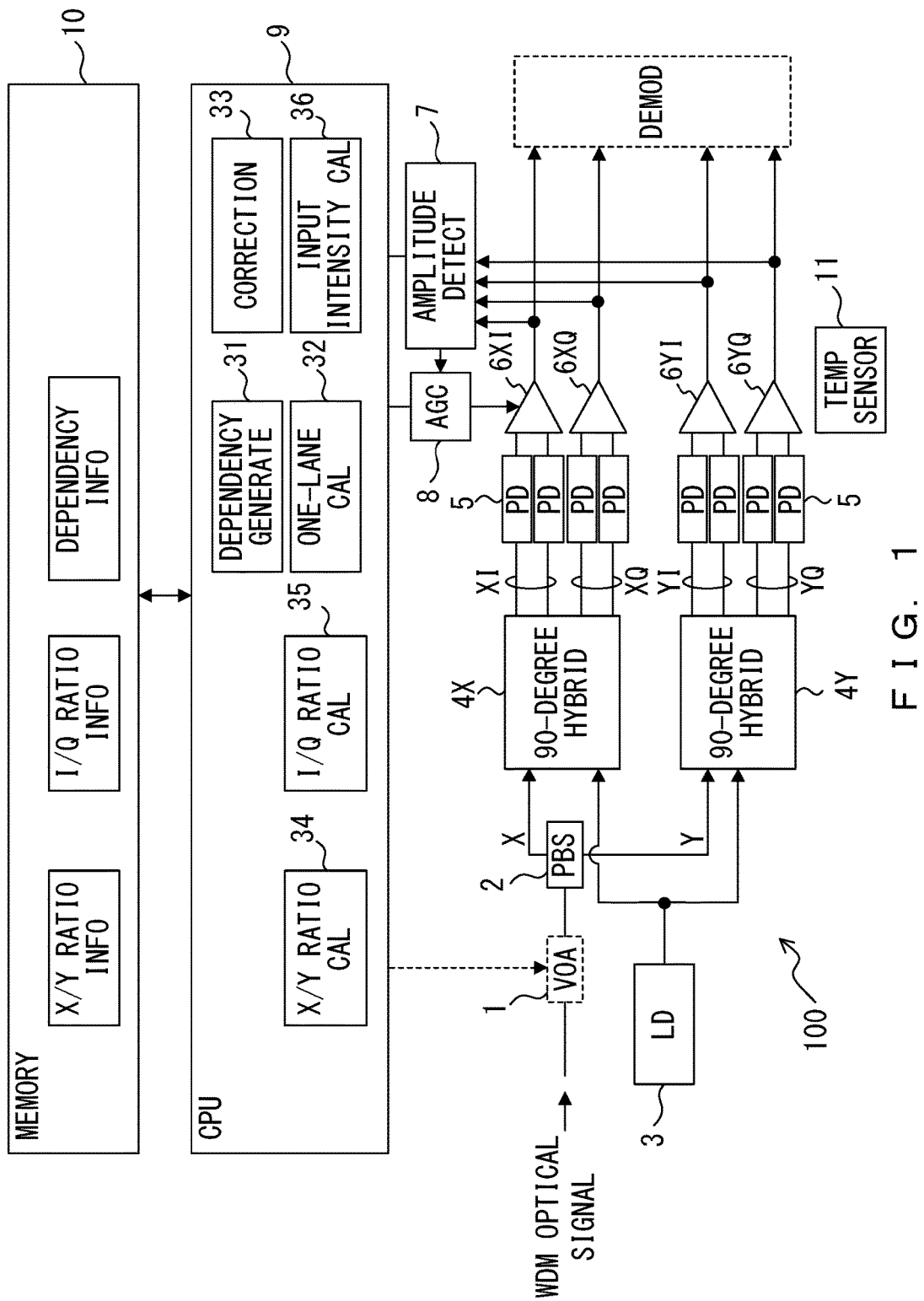
FIG. 1 illustrates an example of an optical receiver according to a first embodiment.

FIG. 1 illustrates an example of an optical receiver according to a first embodiment of the present invention. An optical receiver 100 according to the first embodiment can selectively receive, by coherent detection, an optical signal of a desired wavelength from among a plurality of optical signals that are multiplexed in a WDM optical signal. Note that "optical intensity" has a similar meaning to "optical power" in the descriptions below.

The optical receiver 100 includes a variable optical attenuator (VOA) 1, a polarization beam splitter (PBS) 2, a local oscillator 3, 90-degree hybrid circuits 4X and 4Y, photo detectors (PD) 5, amplifiers 6XI, 6XQ, 6YI and 6YQ, an amplitude detector 7, a gain controller (AGC) 8, a CPU 9, a memory 10 and a temperature sensor 11. Note that the optical receiver 100 may include circuit elements that are not illustrated in FIG. 1.

The variable optical attenuator 1 attenuates an input optical signal in accordance with an instruction given from the CPU 9. However, the optical receiver 100 does not have to include the variable optical attenuator 1. The polarization beam splitter 2 splits an input optical signal into polarized wave components (an X-polarized wave component and a Y-polarized wave component) that are orthogonal to each other. The X-polarized wave component and the Y-polarized wave component that are output from the polarization beam splitter 2 are guided to the 90-degree hybrid circuits 4X and 4Y, respectively. The local oscillator 3 generates local oscillation light of a target wavelength that is specified through a wavelength instruction. The wavelength instruction specifies a wavelength channel to be extracted from a WDM optical signal. Wavelength instructions are given from for example the user or the network administrator. Alternatively, wavelength instructions may be given from an application.

The 90-degree hybrid circuit 4X mixes the X-polarized wave component of the input optical signal and the local oscillation light so as to generate an XI-component and an XQ-component of a target wavelength. The XI-component indicates an I-component of the X polarization of the input optical signal and the XQ-component indicates a Q-component of the X polarization of the input optical signal. Similarly, the 90-degree hybrid circuit 4Y mixes the Y-polarized wave component of the input optical signal and the local oscillation light so as to generate a YI-component and a YQ-component. The YI-component indicates an I-component of the Y polarization of the input optical signal and the YQ-component indicates a Q-component of the Y polarization of the input optical signal. In this example, the XI-component, the XQ-component, the YI-component and the YQ-component are indicated by differential signals, respectively. Then, the XI-component, the XQ-component, the YI-component and the YQ-component are converted into electric signals by their corresponding photo detectors 5.

Note that the polarization beam splitter 2, the local oscillator 3, the 90-degree hybrid circuits 4X and 4Y and the photo detectors 5 are an example of a coherent detection circuit. The coherent detection circuit mixes the input optical signal and the local oscillation light so as to generate a first electric signal indicating the XI-component, a second electric signal indicating the XQ-component, a third electric signal indicating the YI-component and a fourth electric signal indicating the YQ-component.

In the descriptions below, a combination of a polarization and a phase component may be referred to as a "lane". For example, an I-component in an X polarization may be referred to as a "lane XI". Also, each lane is provided with its corresponding amplifier. In this example, the lanes XI, XQ, YI and YQ are provided with the amplifiers 6XI, 6XQ, 6YI and 6YQ, respectively. Accordingly, selecting or specifying a lane is equivalent to selecting or specifying an amplifier.

The amplifiers 6XI, 6XQ, 6YI and 6YQ respectively amplify output signals from the photo detectors 5 provided in their corresponding lanes. Specifically, the amplifier 6XI provided for the lane XI amplifies an electric signal indicating the XI-component of an input optical signal, and the amplifier 6XQ provided for the lane XQ amplifies an electric signal indicating the XQ-component of the input optical signal. Similarly, the amplifier 6YI provided for the lane YI amplifies an electric signal indicating the YI-component of the input optical signal, and the amplifier 6YQ provided for the lane YQ amplifies an electric signal indicating the YQ-component of the input optical signal. The demodulation circuit (DEMOD) demodulates output signals of the amplifiers 6XI, 6XQ, 6YI and 6YQ so as to recover transmission data.

The amplitude detector 7 detects the amplitude of the output signal of each of the amplifiers 6XI, 6XQ, 6YI and 6YQ (which will be referred to as an output amplitude). The gain controller 8 controls the gain of each of the amplifiers 6XI, 6XQ, 6YI and 6YQ in the AGC (automatic gain control) mode. In this example, the gain controller 8 controls the gains of the amplifiers 6XI, 6XQ, 6YI and 6YQ such that output amplitudes of the amplifiers 6XI, 6XQ, 6YI and 6YQ respectively approach their corresponding target amplitudes. The target amplitudes are specified by for example the CPU 9.

The CPU 9 calculates an input optical intensity of a target wavelength channel. Also, the CPU 9 may control the variable optical attenuator 1 based on the calculated input optical intensity. In such a case, the CPU 9 controls the attenuation amount in the variable optical attenuator 1 such that for example the sensitivity of the photo detectors 5 increases. Further, the CPU 9 may provide different functions. Note that the CPU 9 includes a processor and a memory. Also, the CPU 9 provides the above functions by executing a given program.

The memory 10 stores dependency relation information (DEPENDENCY INFO), X/Y intensity ratio information (X/Y RATIO INFO), and I/Q intensity ratio information (I/Q RATIO INFO), which will be described later. The memory 10 may store a program that is executed by the CPU 9. Also, the memory 10 may store information that is not illustrated in FIG. 11. The temperature sensor 11 is provided in the vicinity of the amplifiers (6XI, 6XQ, 6YI and 6YQ) and measures the temperature in the vicinity of the amplifiers.

In the optical receiver 100, the input optical intensity of a target wavelength channel can be calculated based on the input optical intensity of each of the lanes (XI, XQ, YI and YQ). In this example, the input optical intensity of each lane is calculated based on the gain of its corresponding amplifier. For example, the input optical intensity of the lane XI is calculated based on the gain of the amplifier 6XI. In this example, when calculating the input optical intensity of a target wavelength channel, the CPU 9 accesses the gain controller 8 so as to obtain the gain information of each of the amplifiers 6XI, 6XQ, 6YI and 6YQ, and calculates the input optical intensity of each lane based on the obtained gain information. Then, the CPU 9 can detect the input optical intensity of a target wavelength channel by calculating the sum of the input optical intensities of the respective lanes.

Figure 2:
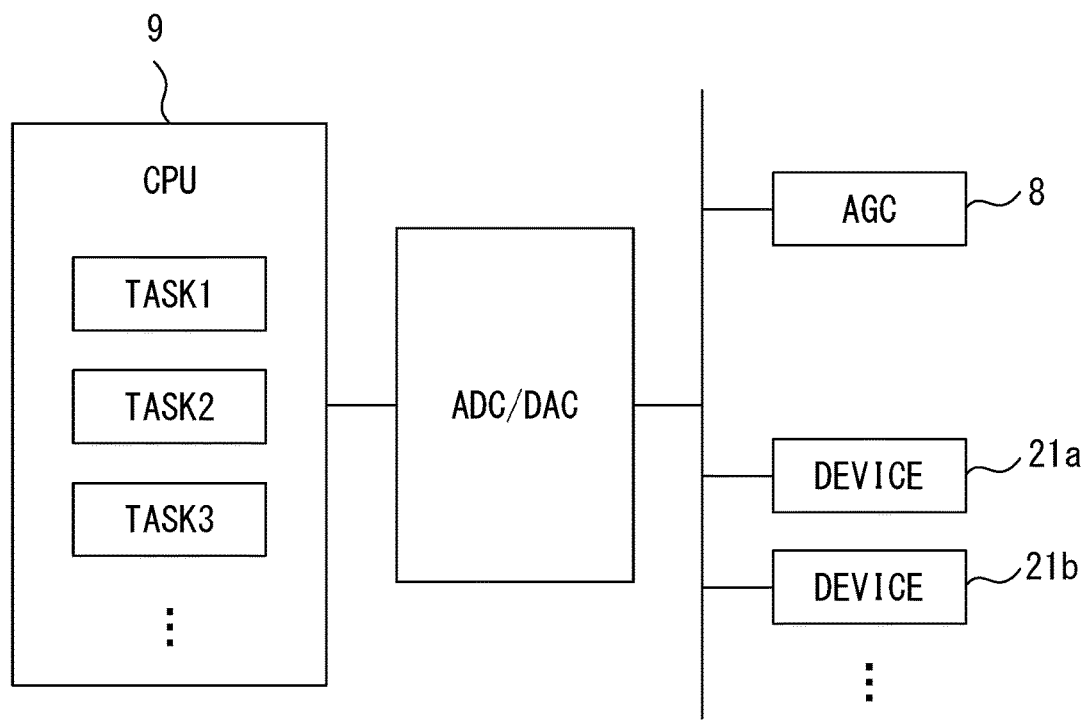
FIG. 2 schematically illustrates a configuration for executing a plurality of tasks.

Meanwhile, when there is a demand for downsizing and/or cost reduction of the optical receiver 100, it is desirable that the CPU 9 execute a plurality of tasks as illustrated in FIG. 2. Each task includes a process of accessing a corresponding device. Note that devices 21a, 21b, . . . illustrated in FIG. 2 are equivalent to the variable optical attenuator 1, the amplitude detector 7, the temperature sensor 11, the demodulation circuit, etc.

The plurality of tasks are executed in for example time division multiplexing. The CPU 9 sequentially obtains gain information of the amplifiers 6XI, 6XQ, 6YI and 6YQ from the gain controller 8, and uses the obtained gain information to sequentially calculate the input optical intensities of target wavelength channels. In such a case, obtaining gain information from the gain controller 8 results in a long reading time. In other words, a long time is taken to calculate input optical intensities. This may result in a delay in other tasks. Alternatively, it may result in the need for longer execution intervals for other tasks.

In view of this, the optical receiver 100 calculates the input optical intensity of a target wavelength channel based on gain information of one of the four lanes (XI, XQ, YI and YQ). When the respective lanes have equal input optical intensities, the input optical intensity of a target wavelength channel can be calculated by multiplying the input optical intensity of one of the lanes by four. However, an X-polarized wave component and a Y-polarized wave component output from the polarization beam splitter 2 do not always have equal intensities. In addition, I-components and Q-components generated by the respective 90-degree hybrid circuits (4X and 4Y) do not always have equal intensities, either. Thus, the optical receiver 100 calculates the input optical intensity of a target wavelength channel while taking these factors into consideration.

The CPU 9 can provide respective functions of a dependency relation generator (DEPENDENCY GENERATE) 31, a one-lane intensity calculator (ONE-LANE CAL) 32, a correction unit (CORRECTION) 33, an X/Y intensity ratio calculator (X/Y RATIO CAL) 34, an I/Q intensity ratio calculator (I/Q RATIO CAL) 35 and an input optical intensity calculator (INPUT INTENSITY CAL) 36. Note that the CPU 9 may provide functions that are not illustrated in FIG. 1.

The dependency relation generator 31 generates dependency relation information for each lane. Dependency relation information represents a relationship between the gain of an amplifier and an input optical intensity. Dependency relation information generated by the dependency relation generator 31 is stored in the memory 10.

FIG. 3 illustrates an example of a dependency relation between the gain of an amplifier and an input optical intensity of the lane XI. The horizontal axis represents gain control voltage of the amplifier 6XI and the vertical axis represents input optical intensities of the lane XI. Note that the output amplitude of the amplifier 6XI is held at 1Vpp in the AGC mode under an environment of 25 degrees Celsius.

This dependency relation is generated by for example measuring a gain control voltage at each sampling point while changing the input optical intensity of the optical receiver 100 by using a probe light source. In this measurement, the input optical intensity of the lane XI is calculated from an output signal of the photo detector 5 provided for the lane XI. Note that the gain of the amplifier 6XI uniquely corresponds to a gain control voltage applied from the gain controller 8 to the amplifier 6XI.

Dependency relation information is represented by for example a dependency formula, which represents a dependency between the gain of an amplifier and an input optical intensity. In such a case, the dependency formula is generated by obtaining an approximate curve based on measurement values at a plurality of sampling points. Also, the dependency relation is generated for each lane.

When the optical receiver 100 can set an arbitrary target output amplitude by selecting from among a plurality of target output amplitudes, dependency relation information is generated for each target output amplitude. For example, when the AGC by the gain controller 8 provides 1Vpp and 1.5Vpp, dependency relation information is generated for each of 1Vpp and 1.5Vpp.

The output amplitudes of the amplifiers 6XI, 6XQ, 6YI and 6YQ are controlled by the gain controller 8 such that the output amplitudes respectively approach the target amplitudes. This target amplitude is known to the CPU 9. Accordingly, by using dependency relation information, the CPU 9 can calculate the input optical intensity of a target lane from the gain (or the gain control voltage) of the amplifier corresponding to that target lane.

The dependency relation between the gain of an amplifier and an input optical intensity varies depending upon the wavelength of the input optical signal and the temperature of the amplifier. Accordingly, the dependency relation generator 31 may generate wavelength dependency information for compensating for the wavelength dependency and generate temperature dependency information for compensating for the temperature dependency.

When generating wavelength dependency information, gains of an amplifier and input optical intensities are measured for different wavelengths while changing the wavelength of the probe light. Thereby, as illustrated in FIG. 4A, dependency relation curves are obtained respectively for a plurality of different wavelengths. Then, the dependency relation generator 31 generates wavelength dependency information based on these dependency relation curves. Wavelength dependency information is represented by for example ΔP1 [μW/nm]. In this case, the wavelength dependency information indicates that "input optical intensity is corrected by ΔP1 [μW] when the wavelength of the input optical intensity has shifted by 1 nm with respect to a reference wavelength. Note that the reference wavelength is for example a center wavelength of a signal band of a WDM optical signal.

When generating temperature dependency information, gains of an amplifier and input optical intensities are measured for different temperatures while changing the temperature in the vicinity of the amplifier. Thereby, as illustrated in FIG. 4B, dependency relation curves are obtained respectively for a plurality of different temperatures. Then, the dependency relation generator 31 generates temperature dependency information based on these dependency relation curves. Temperature dependency information is represented by for example ΔP2 [μW/degree]. In this case, the temperature dependency information indicates that "input optical intensity is corrected by ΔP2 [μW] when the temperature in the vicinity of the amplifier has shifted by 1 degree with respect to a reference temperature. Note that the reference temperature is for example a temperature that is specified in advance (such as 25 degrees Celsius).

The one-lane intensity calculator 32 calculates the input optical intensity of each lane. At this time, the one-lane intensity calculator 32 refers to dependency relation information stored in the memory 10. When calculating the input optical intensity of the lane XI for example, the one-lane intensity calculator 32 detects the gain of the amplifier 6XI. Then, the one-lane intensity calculator 32 calculate the input optical intensity corresponding to the gain of the amplifier 6XI based on the dependency relation information illustrated in FIG. 3. Also, the one-lane intensity calculator 32 calculates the input optical intensities respectively of the lanes XQ, YI and YQ in a similar manner.

Based on the wavelength, temperature or the output amplitude, the correction unit 33 corrects input optical intensities calculated by the one-lane intensity calculator 32 as needed. Specifically, based on the carrier wavelength of the target wavelength channel for which the input optical intensity is to be calculated, the correction unit 33 can use the above wavelength dependency information for correcting input optical intensity calculated by the one-lane intensity calculator 32. Also, based on the temperature measured by the temperature sensor 11, the correction unit 33 can use the above temperature dependency information for correcting input optical intensity calculated by the one-lane intensity calculator 32. Further, based on a difference between the output amplitude detected by the amplitude detector 7 and the target output amplitude, the correction unit 33 may correct input optical intensity calculated by the one-lane intensity calculator 32.

The X/Y intensity ratio calculator 34 calculates the ratio of the input optical intensities between the X polarization and the Y polarization of a target wavelength channel (X/Y intensity ratio or polarization dependent intensity ratio) based on the input optical intensity of each lane calculated by the one-lane intensity calculator 32. The X/Y intensity ratio is calculated by for example formula (1). Note that the intensity XI, the intensity XQ, the intensity YI and the intensity YQ respectively indicate the input optical intensity of the lane XI, the input optical intensity of the lane XQ, the input optical intensity of the lane YI and the input optical intensity of the lane YQ that are calculated by the one-lane intensity calculator 32.

$$X/Y \text{ intensity ratio} = \frac{\text{intensity } YI + \text{intensity } YQ}{\text{intensity } XI + \text{intensity } XQ} \quad (1)$$

The I/Q intensity ratio calculator 35 calculates the ratio of the input optical intensities between the I-component and the Q-component (I/Q intensity ratio or phase dependent intensity ratio) of a target wavelength channel based on the input optical intensity of each lane calculated by the one-lane intensity calculator 32. The I/Q intensity ratio is calculated by for example formula (2) by using an X polarization.

$$I/Q \text{ intensity ratio} = \frac{\text{intensity } XQ}{\text{intensity } XI} \quad (2)$$

Also, the I/Q intensity ratio calculator 35 may calculate the I/Q intensity ratio by formula (3) by using a Y polarization.

$$I/Q \text{ intensity ratio} = \frac{\text{intensity } YQ}{\text{intensity } YI} \quad (3)$$

Further, the I/Q intensity ratio calculator 35 may calculate the I/Q intensity ratio by formula (4) by using an X polarization and a Y polarization.

$$I/Q \text{ intensity ratio} = \frac{\text{intensity } XQ + \text{intensity } YQ}{\text{intensity } XI + \text{intensity } YI} \quad (4)$$

X/Y intensity ratio information, which is calculated by the X/Y intensity ratio calculator 34 and represents an X/Y intensity ratio, is stored in the memory 10. I/Q intensity ratio information, which is calculated by the I/Q intensity ratio calculator 35 and represents an I/Q intensity ratio, is also stored in the memory 10.

The input optical intensity calculator 36 calculates the input optical intensity of a target wavelength channel based on the input optical intensity, the X/Y intensity ratio and the I/Q intensity ratio of a specified lane. When the lane XI is specified for example, the input optical intensity calculator 36 calculates the input optical intensity of the target wavelength channel in the following procedures.

(1) The input optical intensity (intensity XQ) of the lane XQ is calculated based on the input optical intensity (intensity XI) of the lane XI calculated by the one-lane intensity calculator 32 and I/Q intensity ratio.
(2) The input optical intensity of the X polarization is calculated by adding the intensity XI and the intensity XQ.
(3) The input optical intensity (intensity Y) of the Y polarization is calculated based on the input optical intensity (intensity X) of the X polarization and X/Y intensity ratio.
(4) The input optical intensity of the target wavelength channel is calculated by adding intensity X and intensity Y.

As described above, the input optical intensity calculator 36 can calculate the input optical intensity of a target wavelength channel based on the input optical intensity of one lane that is specified from among the four lanes. Accordingly, the first embodiment reduces loads on the CPU 9 for calculating the input optical intensity of a target wavelength channel in comparison with a method in which the input optical intensity of a target wavelength channel is calculated based on the input optical intensities of all lanes.

According to the first embodiment, an X/Y intensity ratio, which indicates a ratio of input optical intensities between an X polarization and a Y polarization, and an I/Q intensity ratio, which indicates a ratio of input optical intensities between an I-component and a Q-component, are detected in advance. Also, the input optical intensity calculator 36 calculates the input optical intensity of a target wavelength channel by using the X/Y intensity ratio and the I/Q intensity ratio. Accordingly, even when an X polarization and a Y polarization have different input optical intensities and/or even when an I-component and a Q-component have different input optical intensities, the input optical intensity of a target wavelength channel can be calculated with a high accuracy based on the input optical intensity of one lane.

FIG. 5 is a flowchart illustrating an example of a method of calculating an X/Y intensity ratio and an I/Q intensity ratio. The process of this flowchart is executed by the CPU 9 for example before the optical receiver 100 receives a data signal. The CPU 9 may execute the process of this flowchart periodically. It is assumed that dependency relation information is generated and is stored in the optical receiver 100 before the process of this flowchart is executed.

The processes in S1 through S4 are executed for each of the lanes (XI, XQ, YI and YQ). Hereinafter, processes for a case when S1 through S4 are executed for the lane XI are described.

In S1, the one-lane intensity calculator 32 accesses the gain controller 8 so as to obtain a gain control voltage representing the gain of the amplifier 6XI. In S2, the one-lane intensity calculator 32 obtains the dependency relation information for the lane XI from the memory 10. In S3, based on the dependency relation information obtained in S2, the one-lane intensity calculator 32 calculates the input optical intensity corresponding to the gain control voltage obtained in S1. As a result of this, the input optical intensity of the lane XI is calculated. In S4, based on the output amplitude of the amplifier 6XI, the correction unit 33 corrects the input optical intensity calculated in S3. The output amplitude of the amplifier 6XI is detected by the amplitude detector 7. As described above, the processes in S1 through S4 are executed for each of the lanes (XI, XQ, YI and YQ), and thereby the input optical intensity of each lane is calculated.

In S5, based on the temperature in the vicinity of the amplifiers, the correction unit 33 corrects the input optical intensity calculated for each lane. The temperature in the vicinity of the amplifiers is measured by the temperature sensor 11. In S6, based on the carrier wavelength of the target wavelength channel, the correction unit 33 corrects the input optical intensity calculated for each lane.

In S7, the X/Y intensity ratio calculator 34 calculates the X/Y intensity ratio based on the input optical intensity of each lane. The X/Y intensity ratio is calculated by formula (1) for example. In S8, the I/Q intensity ratio calculator 35 calculates the I/Q intensity ratio based on the input optical intensity of each lane. The I/Q intensity ratio is calculated by one of formulas (2) through (4) for example. The CPU 9 stores X/Y intensity ratio information, which represents the calculated X/Y intensity ratio, and I/Q intensity ratio information, which represents the calculated I/Q intensity ratio, in the memory 10. When the memory 10 has already stored the X/Y intensity ratio information and the I/Q intensity ratio information, the CPU 9 updates the X/Y intensity ratio information and the I/Q intensity ratio information by an X/Y intensity ratio and an I/Q intensity ratio that are calculated newly.

Figure 6:
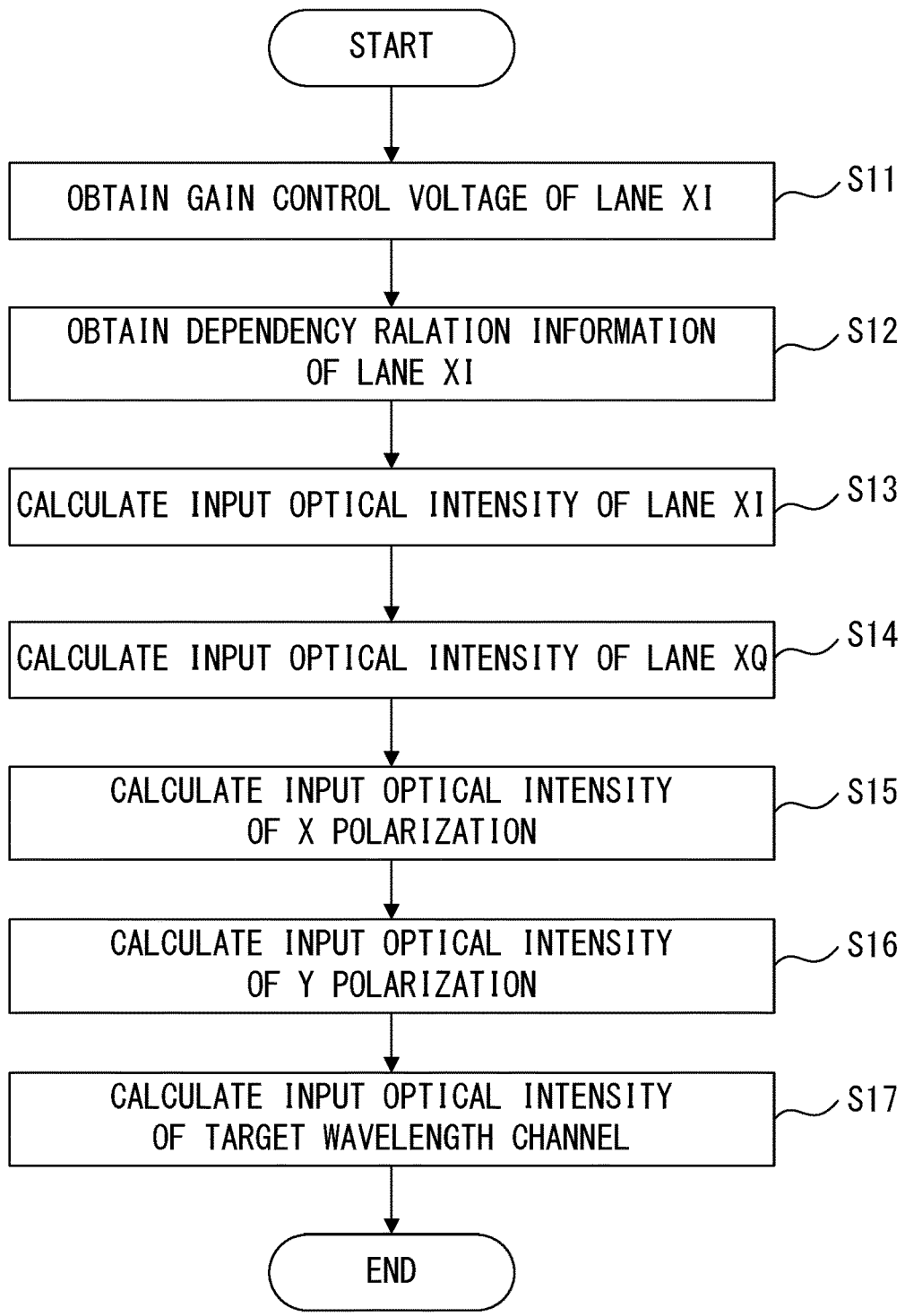
FIG. 6 is a flowchart illustrating an example of a method of calculating the input optical intensity of a target wavelength channel.

FIG. 6 is a flowchart illustrating an example of a method in which the input optical intensity of a target wavelength channel is calculated. The process of this flowchart is executed for example periodically by the CPU 9. It is assumed that X/Y intensity ratio information and I/Q intensity ratio information are stored in the memory 10 before the process of this flowchart is executed. It is also assumed in the descriptions below that the amplifier 6XI is selected from among the four amplifiers (6XI, 6XQ, 6YI and 6YQ). In other words, it is assumed that the input optical intensity of a target wavelength channel is calculated based on the input optical intensity of the lane XI.

In S11, the input optical intensity calculator 36 accesses the gain controller 8 so as to obtain the gain control voltage representing the gain of the amplifier 6XI. In S12, the input optical intensity calculator 36 obtains the dependency relation information for the lane XI from the memory 10. In S13, based on the dependency relation information obtained in S12, the input optical intensity calculator 36 calculates the input optical intensity corresponding to the gain control voltage obtained in S11. As a result of this, the input optical intensity of the lane XI is calculated. Note that S11 through S13 executed by the input optical intensity calculator 36 are substantially the same as S1 through S3 executed by the one-lane intensity calculator 32 in FIG. 5. Thereafter, based on the output amplitude, temperature of the amplifier 6XI, and/or the carrier wavelength of the target wavelength channel, the input optical intensity calculator 36 may correct the input optical intensity obtained in S3.

In S14, based on the input optical intensity of the lane XI and the I/Q intensity ratio, the input optical intensity calculator 36 calculates the input optical intensity of the lane XQ. In S15, the input optical intensity calculator 36 calculates the input optical intensity of the X polarization of the target wavelength channel based on the input optical intensity of the lane XI and the input optical intensity of the lane XQ. In S16, the input optical intensity calculator 36 calculates the input optical intensity of the Y polarization of the target wavelength channel based on the input optical intensity of the X polarization and the X/Y intensity ratio. Thereafter, in S17, the input optical intensity calculator 36 calculates the input optical intensity of the target wavelength channel based on the input optical intensity of the X polarization and the input optical intensity of the Y polarization.

In S14 through S17, the following calculations for example are carried out. In the calculations, $P\_{XI}$ represents the input optical intensity of the lane XI. $P\_{XQ}$ represents the input optical intensity of the lane XQ. $R\_{IQ}$ represents the I/Q intensity ratio. $P\_X$ represents the input optical intensity of the X polarization of a target wavelength channel. $P\_Y$ represents the input optical intensity of the Y polarization of the target wavelength channel. $R\_{XY}$ represents the X/Y intensity ratio. $P\_{IN}$ represents the input optical intensity of the target wavelength channel.

$$P\_{XQ} = P\_{XI} * R\_{IQ} \qquad \text{S14:}$$

$$P\_X = P\_{XI} + P\_{XQ} \qquad \text{S15:}$$

$$P\_Y = P\_X * R\_{XY} \qquad \text{S16:}$$

$$P\_{IN} = P\_X + P\_Y \qquad \text{S17:}$$

While the input optical intensity of a target wavelength channel is calculated based on the input optical intensity of the lane XI in the above example, the input optical intensity calculator 36 may calculate the input optical intensity of a target wavelength channel based on the input optical intensity of a different lane. When for example the input optical intensity of a target wavelength channel is calculated based on the input optical intensity of the lane YQ, the following calculations are carried out in S14 through S17.

$$P\_{YI} = P\_{YQ} * (1/R\_{IQ}) \qquad \text{S14:}$$

$$P\_Y = P\_{YI} + P\_{YQ} \qquad \text{S15:}$$

$$P\_X = P\_Y * (1/R\_{XY}) \qquad \text{S16:}$$

$$P\_{IN} = P\_X + P\_Y \qquad \text{S17:}$$

As described above, in the first embodiment, the input optical intensity of a target wavelength channel is calculated based on the input optical intensity of one lane specified from among the four lanes. Accordingly, the first embodiment reduces loads on the CPU 9 for calculating the input optical intensity of a target wavelength channel in comparison with a method in which the input optical intensity of a target wavelength channel is calculated based on the input optical intensities of all lanes. Also, the first embodiment makes it possible to calculate the input optical intensity of a target wavelength channel more accurately than does a method in which the input optical intensity of a target wavelength channel is calculated based on the input optical intensity of one lane without using an X/Y intensity ratio and an I/Q intensity ratio.

Figure 7:
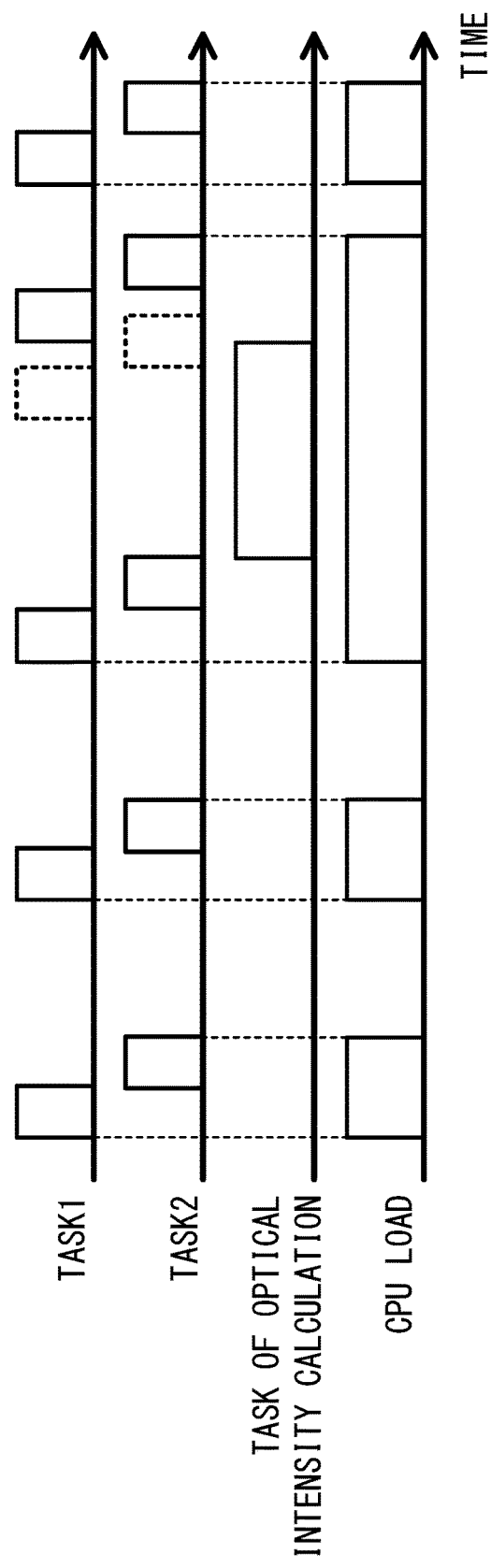
FIG. 7 illustrates an example of CPU loads in a case when the method of the first embodiment is not used.
Figure 8:
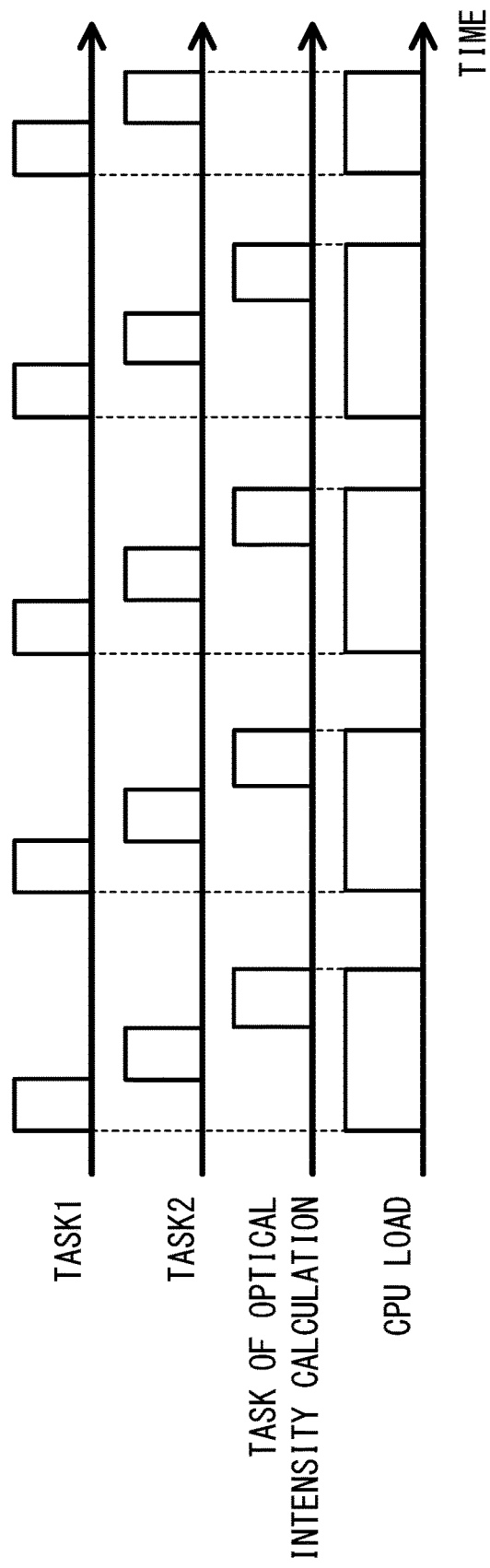
FIG. 8 illustrates an example of CPU loads according to the first embodiment.

FIG. 7 and FIG. 8 illustrate an example of an effect achieved by the first embodiment. Note that the CPU 9 executes, in parallel, tasks 1 and 2 and a task of calculating an input optical intensity in time division multiplexing in the example illustrated in FIG. 7 and FIG. 8.

As illustrated in FIG. 7, a long time is taken to execute an optical intensity calculation task one time in a method in which the input optical intensities of the four lanes (XI, XQ, YI and YQ) are respectively detected. This leads to a risk that when an optical intensity calculation task is executed, the execution of other tasks may be delayed. In FIG. 7, tasks 1 and 2, depicted by the dotted lines, are respectively delayed.

As described above, a method in which the input optical intensities of the respective lanes (XI, XQ, YI and YQ) are detected involves a risk that other tasks may be delayed, and it is thus not preferable to increase the execution cycle of an optical intensity calculation task. Accordingly, there is a possibility that the detection of a change in an input optical intensity may be delayed in the optical receiver. Accordingly, when for example an input optical intensity of the optical receiver has abruptly dropped, a delay may sometimes be caused in the control of the variable optical attenuator, dropping the input optical intensity of the photo detector below a tolerable level. In such a case, the optical receiver may fail to demodulate received signals correctly.

In the first embodiment by contrast, the input optical intensity of a target wavelength channel is calculated based on the gain control voltage of one lane, resulting in a shorter time taken to execute an optical intensity calculation task one time as illustrated in FIG. 8. Thereby, execution of an optical intensity calculation task does not affect other tasks.

As described above, according to the first embodiment, an optical intensity calculation task does not easily affect other tasks, making it possible to increase the execution cycle of an optical intensity calculation task. This makes it possible to instantaneously detect a change in an input optical intensity in the optical receiver 100. Thereby, even when for example an input optical intensity of the optical receiver 100 has abruptly dropped, the variable optical attenuator 1 is controlled instantaneously and the input optical intensities of the photo detectors 5 can be kept within a tolerable range. In such a case, the optical receiver 100 can demodulate received signals correctly.

Second Embodiment

In the first embodiment, the gain control voltage of a lane specified in advance (lane XI for example) is detected and the input optical intensity of a target wavelength channel is calculated based on that gain control voltage. According to the second embodiment by contrast, one lane at a time is sequentially selected from among the four lanes (XI, XQ, YI and YQ), and the input optical intensity of a target wavelength channel is calculated based on the gain control voltage of the selected lane.

Figure 9:
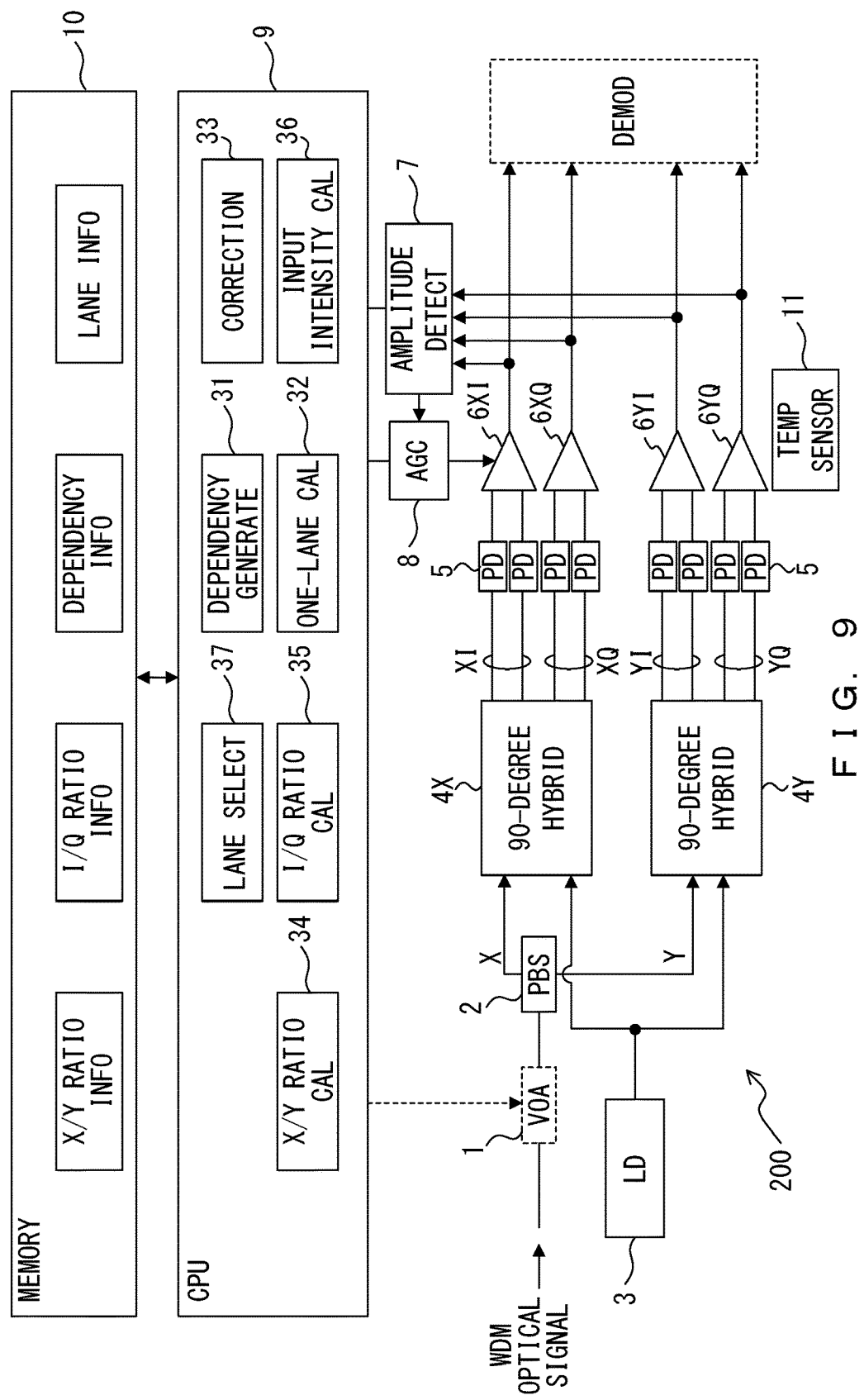
FIG. 9 illustrates an example of an optical receiver according to a second embodiment.

FIG. 9 illustrates an example of an optical receiver according to the second embodiment of the present invention. An optical receiver 200 according to the second embodiment has a similar configuration to that of the optical receiver 100 according to the first embodiment. However, the CPU 9 includes a lane selector (LANE SELECT) 37 in the second embodiment. Also, the memory 10 stores lane information (LANE INFO).

The lane selector 37 selects a lane for which a gain control voltage is to be detected (i.e., an amplifier for which a gain is to be detected). In this example, when an input optical intensity of target wavelength channel is repeatedly calculated in the optical receiver 200, the lane selector 37 cyclically selects one lane from among the four lanes (XI, XQ, YI and YQ). Then, the input optical intensity calculator 36 calculates the input optical intensity of a target wavelength channel based on the gain control voltage of the lane selected by the lane selector 37. Lane information stored in the memory 10 identifies a lane selected by the lane selector 37.

Figure 10:
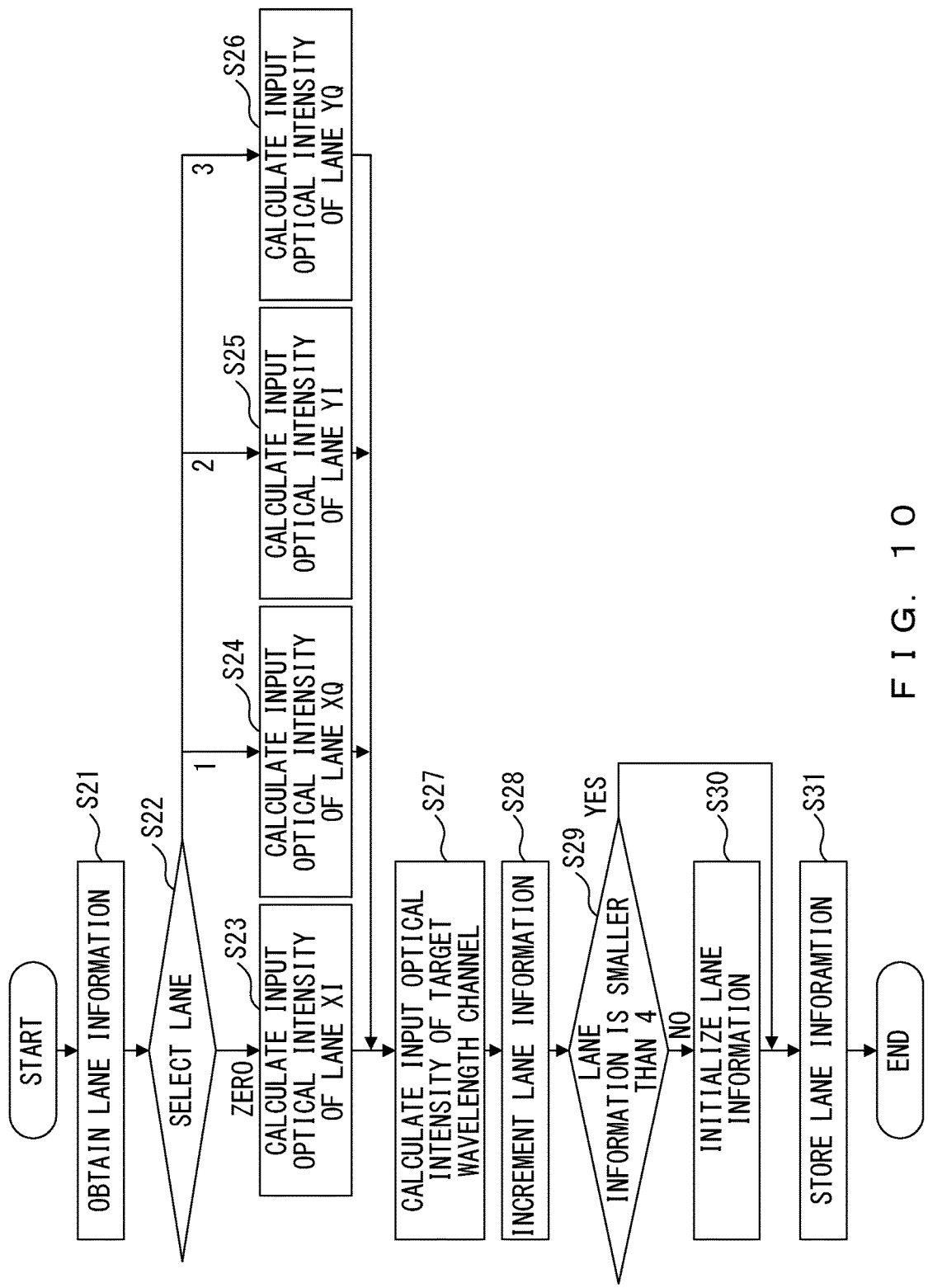
FIG. 10 is a flowchart illustrating an example of a method of calculating the input optical intensity of a target wavelength channel in the second embodiment.

FIG. 10 is a flowchart illustrating an example of a method of calculating an input optical intensity of a target wavelength channel in the second embodiment. The process in this flowchart is executed by the CPU 9 periodically.

In S21, the lane selector 37 obtains lane information from the memory 10. Lane information identifies one of the four lanes (XI, XQ, YI and YQ). Thus, lane information represents 0, 1, 2 or 3. Also, the initial value for the lane information is zero. The lane selector 37 selects a lane in accordance with lane information in S22.

When lane information indicates zero, the lane selector 37 selects the lane XI. In such a case, the input optical intensity calculator 36 calculates the input optical intensity of the lane XI in S23. The process in S23 is substantially the same as those in S11 through S13 illustrated in FIG. 6. In other words, the input optical intensity calculator 36 calculates the input optical intensity of the lane XI based on the gain (or gain control voltage) of the amplifier 6XI.

Similarly, when the lane information indicates 1, the lane XQ is selected, and the input optical intensity calculator 36 calculates the input optical intensity of the lane XQ in S24. When the lane information indicates 2, the lane YI is selected, and the input optical intensity calculator 36 calculates the input optical intensity of the lane YI in S25. When the lane information indicates 3, the lane YQ is selected, and the input optical intensity calculator 36 calculates the input optical intensity of the lane YQ in S26.

In S27, the input optical intensity calculator 36 calculates the input optical intensity of a target wavelength channel based on the input optical intensity obtained in one of S23 through S26. The process in S27 is substantially the same as those in S14 through S17 illustrated in FIG. 6. Specifically, the input optical intensity calculator 36 calculates the input optical intensity of a target wavelength channel based on the input optical intensity of the selected lane, the X/Y intensity ratio and the I/Q intensity ratio.

In S28, the lane selector 37 increments the lane information by one. In S29, the lane selector 37 determines whether or not the incremented lane information is smaller than four. When the incremented lane information is greater than or equal to four, the lane selector 37 initializes the lane information to zero in S30. When the incremented lane information is smaller than four, the process in S30 is skipped. Then, in S31, the lane selector 37 stores the initialized or incremented lane information in the memory 10.

As described above, in the second embodiment, the gain control voltages of the respective lanes are sequentially used in a case when input optical intensities of target wavelength channels are periodically monitored. Thus, even when respective lanes have circuit elements (such as photo detectors, amplifiers, etc.) with different characteristics, the calculation results of input optical intensities of target wavelength channels are leveled.

Third Embodiment

In the first embodiment, the input optical intensity of a target wavelength channel is calculated based on a gain control voltage of one lane that is specified in advance. In the third embodiment by contrast, the input optical intensity of a target wavelength channel can be calculated based on the gain control voltage of one lane specified by a user or on the gain control voltages of a plurality of lanes specified by the user.

Figure 11:
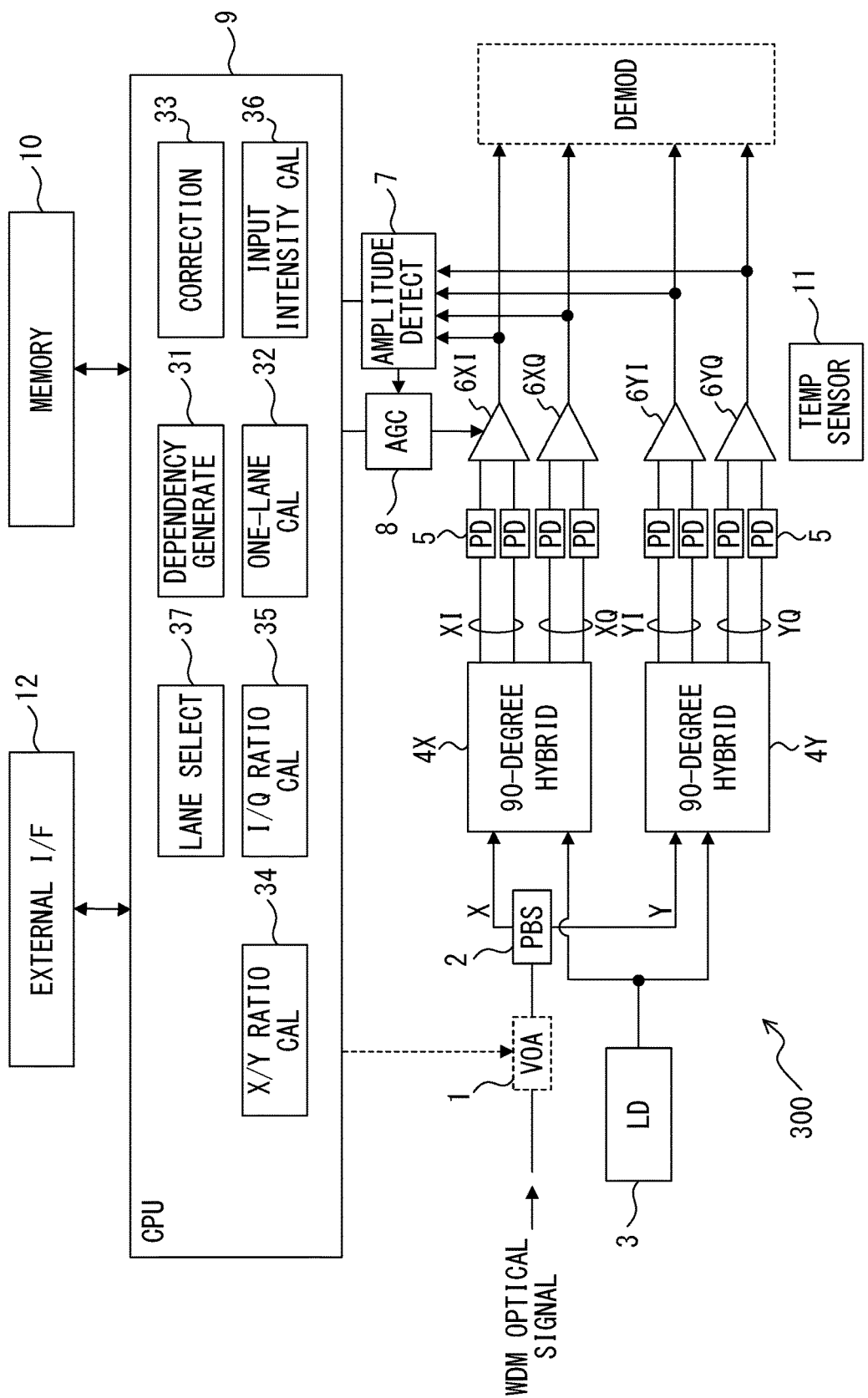
FIG. 11 illustrates an example of an optical receiver according to a third embodiment.

FIG. 11 illustrates an example of an optical receiver according to the third embodiment of the present invention. An optical receiver 300 according to the third embodiment has a similar configuration to that of the optical receiver 100 according to the first embodiment. However, in the third embodiment, the CPU 9 is connected to an external interface 12. The external interface 12 can receive user instructions. Accordingly, the user of the optical receiver 300 can specify one or a plurality of desired lanes through the external interface 12.

The input optical intensity calculator 36 detects the gain control voltage of a lane specified by the user. When a plurality of lanes are specified by the user, the input optical intensity calculator 36 detects the gain control voltages of the respective specified lanes. Then, the input optical intensity calculator 36 calculates the input optical intensity of a target wavelength channel based on the detected gain control voltage. When no lane is specified by the user, the input optical intensity calculator 36 may calculate the input optical intensity of a target wavelength channel based on the gain control voltage of one lane that is specified in advance.

When for example the lanes XI and YQ are specified by the user, the input optical intensity calculator 36 calculates input optical intensity $P\_{xi}$ of the lane XI based on the gain control voltage of the amplifier 6XI, and calculates input optical intensity $P\_{yq}$ of the lane YQ based on the gain control voltage of the amplifier 6YQ. The input optical intensity calculator 36 calculates input optical intensity $P\_{xq}$ of the lane XQ from $P\_{xi}$ and the I/Q intensity ratio, and calculates input optical intensity $P\_{yi}$ of the lane YI from $P\_{yq}$ and the I/Q intensity ratio. Then, the input optical intensity calculator 36 obtains the sum of $P\_{xi}$, $P\_{xq}$, $P\_{yi}$ and $P\_{yq}$ so as to calculate the input optical intensity of a target wavelength channel.

Alternatively, when the user specifies the lanes XI, XQ and YQ, the input optical intensity calculator 36 calculates input optical intensity $P\_{xi}$ of the lane XI based on the gain control voltage of the amplifier 6XI, calculates input optical intensity $P\_{xq}$ of the lane XQ based on the gain control voltage of the amplifier 6XQ, and calculates input optical intensity $P\_{yq}$ of the lane YQ based on the gain control voltage of the amplifier 6XQ. Also, the input optical intensity calculator 36 calculates input optical intensity $P\_{yi}$ of the lane YI from $P\_{yq}$ and the I/Q intensity ratio. Then, the input optical intensity calculator 36 obtains the sum of $P\_{xi}$, $P\_{xq}$, $P\_{yi}$ and $P\_{yq}$ so as to calculate the input optical intensity of a target wavelength channel.

Note that when all the lanes (i.e., lanes XI, XQ, YI and YQ) are specified by the user, there is a risk that the loads on the CPU 9 may increase as explained by referring to FIG. 7. In such a case accordingly, the CPU 9 may output an alarm through the external interface 12.

Fourth Embodiment

As described above, the input optical intensity of a target wavelength channel is calculated by using an X/Y intensity ratio and an I/Q intensity ratio. However, an X/Y intensity ratio and an I/Q intensity ratio may sometimes change due to a change in temperatures or due to aging. For example, the characteristics of the polarization beam splitter 2, the local oscillator 3, the 90-degree hybrid circuits 4X and 4Y, the photo detectors 5 and the amplifiers 6XI, 6XQ, 6YI and 6YQ may change due to temperatures or aging. When an X/Y intensity ratio and an I/Q intensity ratio are not correct, it is difficult for the CPU 9 to calculate the input optical intensity of a target wavelength channel highly accurately. In view of this, the optical receiver according to the fourth embodiment has a function of periodically calculating an X/Y intensity ratio and an I/Q intensity ratio.

Figure 12:
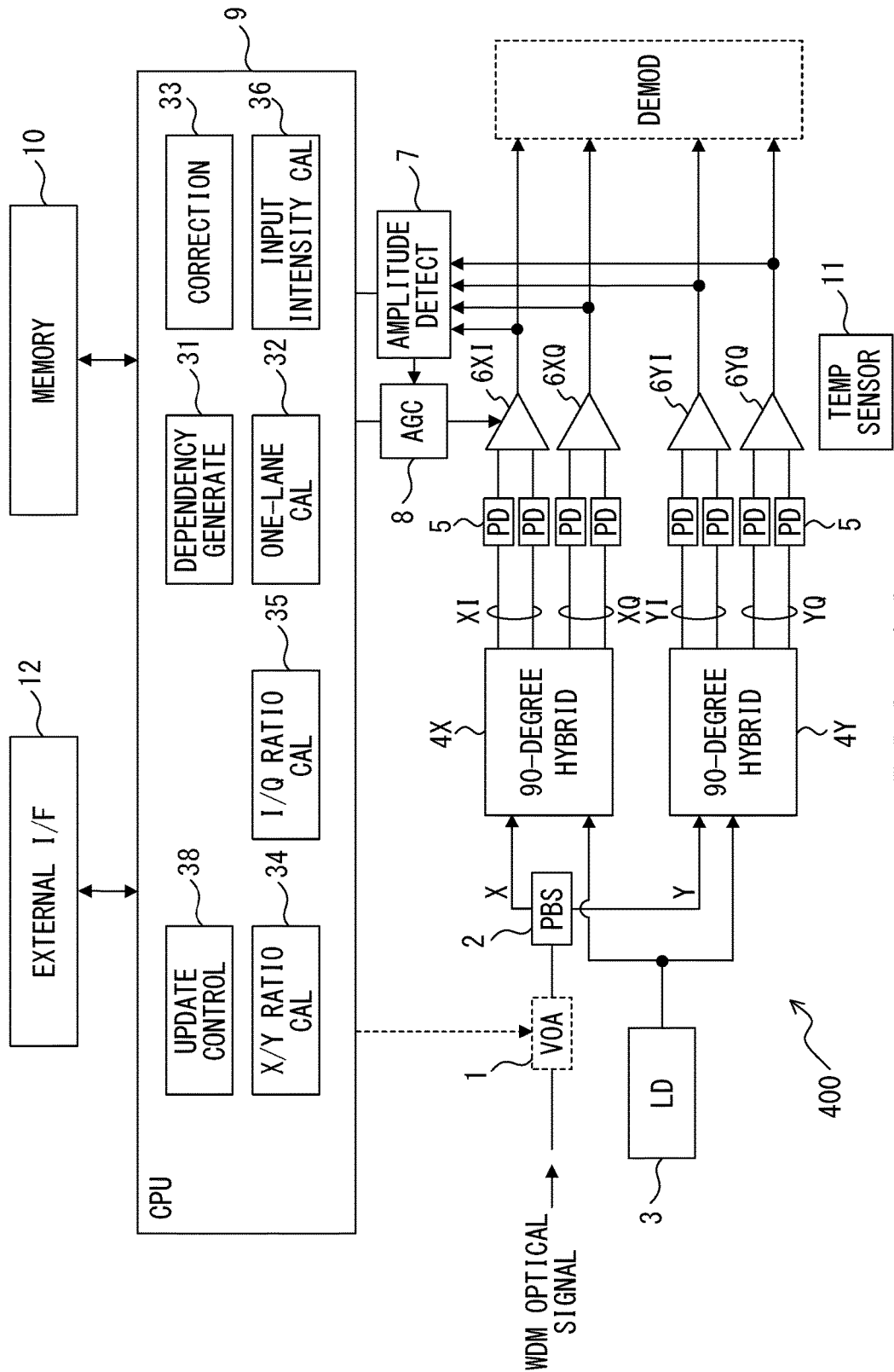
FIG. 12 illustrates an example of an optical receiver according to a fourth embodiment.

FIG. 12 illustrates an example of an optical receiver according to the fourth embodiment of the present invention. An optical receiver 400 according to the fourth embodiment has a similar configuration to that of the optical receiver 100 according to the first embodiment. However, in the fourth embodiment, the CPU 9 is connected to the external interface 12. Also, the CPU 9 includes an update cycle controller (UPDATE CONTROL) 38.

The user of the optical receiver 400 can specify an update cycle of an X/Y intensity ratio and an I/Q intensity ratio through the external interface 12. A user instruction that specifies an update cycle is given to the update cycle controller 38.

The update cycle controller 38 controls the X/Y intensity ratio calculator 34 and the I/Q intensity ratio calculator 35 in accordance with a user instruction. Specifically, the update cycle controller 38 activates the X/Y intensity ratio calculator 34 and the I/Q intensity ratio calculator 35 in an update cycle specified by the user.

When activated by the update cycle controller 38, the X/Y intensity ratio calculator 34 calculates an X/Y intensity ratio based on the gain control voltage of each lane. Also, when activated by the update cycle controller 38, the I/Q intensity ratio calculator 35 calculates an I/Q intensity ratio based on the gain control voltage of each lane. In other words, the process of the flowchart illustrated in FIG. 5 is periodically executed in accordance with an update cycle specified by the user. Then, X/Y intensity ratio information and I/Q intensity ratio information respectively representing the newly calculated X/Y intensity ratio and I/Q intensity ratio are stored in the memory 10.

As described above, in the fourth embodiment, the input optical intensity of a target wavelength channel is calculated by using the latest X/Y intensity ratio and I/Q intensity ratio. This suppresses influences of temperatures and/or aging, leading to a higher accuracy in the calculation of the input optical intensity of a target wavelength channel.

Note that when an update cycle is short, the CPU 9 accesses the gain controller 8 highly frequently, increasing the amount of computation conducted by the CPU 9. In other words, a short update cycle increases the loads on the CPU 9. Accordingly, the CPU 9 may output an alarm via the external interface 12 when an update cycle specified by the user is shorter than a prescribed threshold. Also, when an update cycle is not specified by the user, the CPU 9 may update the X/Y intensity ratio and the I/Q intensity ratio in a cycle that is selected in advance.

Other Embodiments

The first through fourth embodiments may be implemented in combination in a manner such that there will be no contradiction. For example, the X/Y intensity ratio and the I/Q intensity ratio may be updated periodically by using the update cycle controller 38 in the first, second or third embodiments respectively illustrated in FIG. 1, FIG. 9 and FIG. 11.

While an input optical intensity calculated by the CPU 9 is used for controlling the variable optical attenuator 1 in the first through fourth embodiments, the embodiments are not limited to such configurations. For example, the CPU 9 may display a calculated input optical intensity in a display device. Alternatively, the CPU 9 may report a calculated input optical intensity to a transmission node or a network administration system.

While the optical receivers 100, 200, 300 and 400 receive an optical signal of a desired wavelength selectively from among a plurality of optical signals that are multiplexed in a WDM optical signal in the above examples, the embodiments are not limited to such configurations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical receiver comprising:
a coherent detection circuit configured to mix a polarization multiplexed optical signal and local oscillation light so as to generate a first electric signal that indicates an in-phase component in a first polarization, a second electric signal that indicates a quadrature component in the first polarization, a third electric signal that indicates an in-phase component in a second polarization, and a fourth electric signal that indicates a quadrature component in the second polarization;
first through fourth amplifiers respectively configured to amplify the first through fourth electric signals;
a gain controller configured to control gains of the first through fourth amplifiers such that amplitudes of output signals of the first through fourth amplifiers respectively approach corresponding target amplitudes;
a processor configured
to calculate a first optical intensity that indicates an input optical intensity of an in-phase component in the first polarization based on a gain of the first amplifier, a second optical intensity that indicates an input optical intensity of a quadrature component in the first polarization based on a gain of the second amplifier, a third optical intensity that indicates an input optical intensity of an in-phase component in the second polarization based on a gain of the third amplifier, and a fourth optical intensity that indicates an input optical intensity of a quadrature component in the second polarization based on a gain of the fourth amplifier,
to calculate a polarization dependent intensity ratio that indicates a ratio of an input optical intensity in the first polarization to an input optical intensity in the second polarization and a phase dependent intensity ratio that indicates a ratio of an input optical intensity of the in-phase component to an input optical intensity of the quadrature component based on the first through fourth optical intensities, and
to calculate an input optical intensity of the polarization multiplexed optical signal based on an optical intensity calculated according to a gain of an amplifier that is selected from among the first through fourth amplifiers, the polarization dependent intensity ratio, and the phase dependent intensity ratio.

2. The optical receiver according to claim 1, wherein the processor calculates the polarization dependent intensity ratio by using a sum of the first optical intensity and the second optical intensity and a sum of the third optical intensity and the fourth optical intensity.

3. The optical receiver according to claim 1, wherein the processor calculates the phase dependent intensity ratio by using the first optical intensity and the second optical intensity.

4. The optical receiver according to claim 1, wherein the processor calculates the phase dependent intensity ratio by using the third optical intensity and the fourth optical intensity.

5. The optical receiver according to claim 1, wherein the processor calculates the phase dependent intensity ratio by using a sum of the first optical intensity and the third optical intensity and a sum of the second optical intensity and the fourth optical intensity.

6. The optical receiver according to claim 1, wherein the processor
selects the first optical intensity from among the first through fourth optical intensities,
calculates a fifth optical intensity by multiplying the phase dependent intensity ratio by the first optical intensity,
calculates a sixth optical intensity by adding the fifth optical intensity to the first optical intensity,
calculates a seventh optical intensity by multiplying the polarization dependent intensity ratio by the sixth optical intensity, and
calculates the input optical intensity of the polarization multiplexed optical signal by adding the seventh optical intensity to the sixth optical intensity.

7. The optical receiver according to claim 1, wherein the processor sequentially select one amplifier from among the first through fourth amplifiers, and
the processor calculates the input optical intensity of the polarization multiplexed optical signal based on an optical intensity calculated according to a gain of the selected amplifier, the polarization dependent intensity ratio and the phase dependent intensity ratio.

8. The optical receiver according to claim 1, further comprising
an external interface configured to receive a user instruction, wherein
the processor calculates the input optical intensity of the polarization multiplexed optical signal based on an optical intensity calculated according to a gain of the amplifier specified by the user instruction from among the first through fourth amplifiers, the polarization dependent intensity ratio and the phase dependent intensity ratio.

9. The optical receiver according to claim 1, wherein the processor periodically updates the polarization dependent intensity ratio and the phase dependent intensity ratio based on the first through fourth optical intensities.

* * * * *